(12) United States Patent
Kanda et al.

(10) Patent No.: US 8,895,690 B2
(45) Date of Patent: Nov. 25, 2014

(54) COPOLYMERIZED POLYAMIDE RESIN, METHOD FOR PRODUCING SAME, RESIN COMPOSITION, AND MOLDED ARTICLE FORMED FROM THE COPOLYMERIZED POLYAMIDE RESIN OR THE RESIN COMPOSITION

(75) Inventors: Tomomichi Kanda, Niigata (JP); Minoru Kikuchi, Niigata (JP); Katsumi Shinohara, Niigata (JP); Hideyuki Kurose, Niigata (JP)

(73) Assignee: Mitsubishi Gas Chemical Company, Inc., Tokyo (JP)

( * ) Notice: Subject to any disclaimer, the term of this patent is extended or adjusted under 35 U.S.C. 154(b) by 240 days.

(21) Appl. No.: 13/512,214

(22) PCT Filed: Nov. 24, 2010

(86) PCT No.: PCT/JP2010/070858
§ 371 (c)(1),
(2), (4) Date: Jun. 27, 2012

(87) PCT Pub. No.: WO2011/065347
PCT Pub. Date: Jun. 3, 2011

(65) Prior Publication Data
US 2012/0289643 A1 Nov. 15, 2012

(30) Foreign Application Priority Data

Nov. 27, 2009 (JP) ................................. 2009-269760
Nov. 27, 2009 (JP) ................................. 2009-269762

(51) Int. Cl.
*C08G 69/28* (2006.01)
*C08G 69/26* (2006.01)

(52) U.S. Cl.
CPC .............. *C08G 69/28* (2013.01); *C08G 69/265* (2013.01)
USPC ........... 528/347; 528/310; 528/331; 528/335; 528/339; 528/340

(58) Field of Classification Search
CPC ......... C08L 77/06; C08L 77/02; C08K 5/092; C08J 2377/00; C08J 2377/06; B32B 27/34
USPC .......................... 528/310, 331, 335, 347, 340
See application file for complete search history.

(56) References Cited

U.S. PATENT DOCUMENTS

| 5,587,447 A * | 12/1996 | Harada et al. ................. 528/347 |
| 2005/0009976 A1 * | 1/2005 | Akkapeddi et al. ........... 524/445 |
| 2008/0262193 A1 | 10/2008 | Kurose et al. |
| 2009/0299028 A1 | 12/2009 | Kikuchi et al. |
| 2010/0120961 A1 | 5/2010 | Tanaka et al. |

FOREIGN PATENT DOCUMENTS

| JP | 48 12390 | 4/1973 |
| JP | 54 32458 | 10/1979 |
| JP | 1 14925 | 3/1989 |
| JP | 06 207004 | 7/1994 |
| JP | 07 041670 | 2/1995 |
| JP | 07 324130 | 12/1995 |
| JP | 08 259809 | 10/1996 |
| JP | 2002 060486 | 2/2002 |
| JP | 2007 31475 | 2/2007 |
| JP | 2007 31630 | 2/2007 |
| JP | 2008 280535 | 11/2008 |
| JP | 2010 7055 | 1/2010 |

OTHER PUBLICATIONS

U.S. Appl. No. 13/512,179, filed Jun. 27, 2012, Kikuchi, et al.
International Search Report Issued Mar. 1, 2011 in PCT/JP10/70858 Filed Nov. 24, 2010.

* cited by examiner

*Primary Examiner* — Gregory Listvoyb
(74) *Attorney, Agent, or Firm* — Oblon, Spivak, McClelland, Maier & Neustadt, L.L.P.

(57) ABSTRACT

A copolyamide resin for molding including a diamine component which includes two or more diamines and a dicarboxylic acid component. The diamine component includes 70 mol % or more of a xylylenediamine which includes 20 mol % or more of p-xylylenediamine and the dicarboxylic acid component includes 70 mol % or more of a straight-chain aliphatic dicarboxylic acid having 6 to 18 carbon atoms. The copolyamide resin contains particles having a major diameter of 50 μm or more in an amount of 1000 particles/g or less, the particles being made of a polyamide having a melting point higher than that of the copolyamide resin by 20° C. or more when measured by a differential scanning calorimetry. The copolyamide resin has very uniform and stable properties and is excellent in any of mechanical properties, heat resistance, chemical and physical properties, and molding properties. An efficient production method of the copolyamide resin, its resin composition, and its molded article are also described.

19 Claims, No Drawings

COPOLYMERIZED POLYAMIDE RESIN, METHOD FOR PRODUCING SAME, RESIN COMPOSITION, AND MOLDED ARTICLE FORMED FROM THE COPOLYMERIZED POLYAMIDE RESIN OR THE RESIN COMPOSITION

TECHNICAL FIELD

The present invention relates to a copolyamide resin excellent in mechanical properties, heat resistance, chemical and physical properties, and molding properties, and extremely uniform in its quality; a production method thereof; a resin composition thereof; and a molded article made of the resin composition. More specifically, the present invention relates to a copolyamide resin comprising a dicarboxylic acid component and a two- or more-component diamine component including a specific diamine, which has extremely uniform and stable properties, and an efficient production method thereof, a resin composition thereof, and a molded article made of the resin composition.

BACKGROUND ART

A polyamide resin represented by nylon 6 and nylon 66 is excellent in toughness, chemical resistance, electric properties, etc. and widely used as the molding materials for automotive parts, machine parts, electrical or electronic equipment parts, etc. Of the polyamide resin, a polyamide produced from m-xylylenediamine and adipic acid (may be referred to as "nylon MXD6") is characterized by its high strength, high elasticity, and low water absorption, as compared with the conventional polyamide resin, and comes to be used as a substitute for a metallic material in the production of electronic equipment parts and automotive parts which require light weight and small size. Therefore, the demand for nylon MXD6 is escalating.

Since the crystallization speed of nylon MXD6 is low as compared with those of nylon 6 and nylon 66, nylon MXD6, when used singly, is difficult to crystallize in an injection mold, making the thin-wall molding difficult and causing problems of deformation of molded article and lowering of mechanical strength. To use nylon MXD6 as a molding material while avoiding such disadvantage, Patent Document 1 proposes to increase the crystallization speed of nylon MXD6 by blending nylon 66 or talc powder each having a high crystallization speed or proposes to improve the moldability of nylon MXD6 by increasing the mold temperature. Since the water absorption of a nylon MXD6 composition blended with nylon 66 is higher than that of nylon MXD6 alone, the mechanical strength is reduced by water absorption.

To solve the above problem, Patent Documents 2 and 3 propose to blend inorganic filler with a copolyamide having a high crystallization speed which is produced by using, as the main raw material, a mixture of m-xylylenediamine and p-xylylenediamine as the diamine component and adipic acid as the dicarboxylic acid component. The thin-wall molding, which has been difficult by the use of a conventional molding material containing nylon MXD6, has been made easy by the proposed method. The proposed method makes improvement also in shortening the molding cycle, lowering the mold temperature, and preventing the mechanical properties from being lowered due to water absorption. However, a copolyamide with a uniform high quality has been difficult to obtain by a known method of producing a copolyamide using p-xylylenediamine, because a high melting point copolyamide with a high content of p-xylylenediamine is formed locally, although its amount is very small. The copolyamide with a high p-xylylenediamine content locally formed does not dissolve in the system at the production temperature and granularly disperses throughout the copolyamide being produced without increasing its polymerization degree. A molded article made of the resultant heterogeneous polyamide has uneven mechanical properties and heat resistance due to the dispersed high melting point polyamide.

In a common batchwise production method of polyamide using a nylon salt or its aqueous solution, the aqueous solution of nylon salt is heated under pressure in a single reaction vessel to allow the polymerization to proceed in a homogeneous phase while preventing the diamine component from escaping by evaporation. After fixing the diamine component, the water vapor in the system is gradually released to reduce the pressure finally to atmospheric pressure or reduced pressure, thereby completing the polymerization. In this method, since an aqueous solution of nylon salt with a concentration of about 50 wt % is generally used, a large amount of solvent water and the condensation water eliminated by condensation must be removed. Therefore, a countermeasure should be taken against various disadvantages, such as foaming, solidification of polymer due to the evaporation latent heat of water, heat degradation of polyamide which is adhered to the inner wall of reaction vessel due to a large change of liquid level during the reaction. In addition, this method requires a large amount of heat energy for removing a large amount of water and the single batch yield of polyamide is small. Therefore, this method involves many technical and economical problems. A uniform copolyamide including p-xylylenediamine is also difficult to produce by this method, because the polyamide being produced adheres to the inner wall due to a large change of liquid level and the high melting point polyamide copolymerized with p-xylylenediamine is easily deposited on a stirring shaft having a low heat transfer efficiency during the removal of a large amount of water due to the water returned to the reaction apparatus and its latent heat of evaporation.

As a polymerization method without using a nylon salt or its aqueous solution, Patent Document 4 discloses a method of allowing the reaction to proceed by adding a diamine component containing a small amount of water dropwise to a dicarboxylic acid component at 220° C. under atmospheric pressure. In the method disclosed in Patent Document 5, a mixture of a dicarboxylic acid and a diamine is subjected to polycondensation reaction under atmospheric pressure at a reaction initiation temperature equal to or higher than the melting point of the dicarboxylic acid. The reaction is allowed to proceed by elevating the temperature so as to keep the reaction system containing the raw mixture in substantially uniform molten state. Before the reaction rate reaches 95%, the temperature of the reaction system is raised to a temperature equal to or higher than MP −30° C. wherein MP is the melting point of the copolyamide being formed, thereby controlling the reaction temperature so as to allow the reaction to proceed in homogeneous system without losing its fluidity. These methods are characterized in that the diamine is continuously added to the reaction system while maintaining the reaction system which contains oligoamide and polyamide being formed in uniform molten state. Since the reaction is carried out under atmospheric pressure, the apparatus for the polycondensation reaction is not needed to be pressure-resistant.

As compared with the known production method of polyamide, this method extremely cuts down the time required for the polycondensation reaction, because the operation for increasing or decreasing the pressure of system and the removal of water used as the solvent, which is inevitable in the method using an aqueous solution, are not needed. In addition, this method is very advantageous for the production of copolyamide, because the method requires no heat for concentrating the aqueous solution, and the amount of charge for a single reaction can be increased, to enhance the productivity. However, if the production of a copolyamide including p-xylylenediamine is carried out by this method, the problem of local formation or accumulation of a copolyamide with a high content of p-xylylenediamine becomes more considerable.

In the above production method, the dicarboxylic acid evaporated from the molten dicarboxylic acid deposits on the inner wall of the polymerization apparatus and reacts with the diamine evaporated in the same manner, to form a nylon salt or oligomer. As compared with a salt between m-xylylenediamine and a dicarboxylic acid, since a salt between p-xylylenediamine and a dicarboxylic acid is less soluble in water and also hardly dissolves in the condensation water eliminated by the reaction and returning to the reaction system, the nylon salt including p-xylylenediamine is likely to selectively accumulate. The accumulated nylon salt undergoes the amidation in a solid state and converts into a water-insoluble, high melting point oligomer. If the accumulated oligomer falls away from the wall and enters into the reaction liquid at earlier stage of the production, the oligomer is depolymerized with the reaction liquid before the completion of reaction, to give a uniform product. If enters into the reaction liquid at later stage of the production, since the oligomer is not mixed well with a highly viscous reaction liquid and is not depolymerized completely, the oligomer remains in the polyamide as a high melting point foreign matter. The accumulated product exposed to heat for a long time after repeating the batchwise production becomes a gel material which is insoluble in polyamide, likely to cause uneven properties and deteriorated properties.

Of the parts of a polymerization apparatus, the nylon salt or oligomer mainly accumulates in a pipe for introducing the vapor mainly comprising the condensation water eliminated by the polymerization from a reaction tank to a partial condenser and accumulates in the partial condenser. If continuously accumulated, the pipe and partial condenser is clogged and the batchwise production cannot be continuously repeated. In the production of a polyamide from a diamine and a dicarboxylic acid, it is very important to control the mole balance to achieve a desired degree of polymerization. Since the amount of accumulation in the reaction tank varies batch to batch, it is difficult to control the mole balance precisely. Thus, the production method in which a diamine component is added to a dicarboxylic acid component under atmospheric pressure involves many disadvantages for the production of uniform and satisfactory products.

Patent Document 6 discloses to add a whole amount of diamine to a dicarboxylic acid in an extremely short time and allow the reaction to proceed under pressure. The proposed method involves various disadvantages, which are attributable to the addition of a whole amount of diamine in an extremely short time. Since a large amount of condensation water is eliminated in a short time, a countermeasure should be taken against foaming, change of liquid level, solidification of polymer due to the evaporation latent heat of water, and escape of monomers by evaporation. Particularly, a high pressure is needed. Therefore, it takes a long time to reduce the pressure for allowing the reaction to proceed, because the pressure should be reduced while preventing foaming. During this operation, the polyamide is exposed to high temperature for a long time, this promoting the oxidative degradation of polyamide molecules to cause the yellowing. In addition, a large amount of heat energy is required in a short time for removing a large amount of the condensation water which is eliminated in a short time and maintaining the reaction system at a temperature enough to keep the whole reaction system in fluid condition, thereby requiring a heating means excessively large in view of the amount of the produced polyamide. Thus, the proposed method involves many technical and economical problems.

Patent Document 7 discloses a method in which a diamine component comprising m-xylylenediamine and p-xylylenediamine is added to adipic acid, while decreasing the concentration of p-xylylenediamine in the diamine component in a later stage of the reaction. The proposed method uses different diamine components containing the ingredients in different proportions, thereby increasing the number of equipments to be used. In addition, the diamine component being adding is changed to another during the reaction, this complicating the operation. Thus, the proposed method cannot be said as an efficient method. Since the concentration of p-xylylenediamine in the diamine component used in an earlier stage of the addition is high, the nylon salt and oligomer mentioned above are likely to accumulate in the apparatus. Therefore, the uneven properties due to the inclusion of a high melting point copolyamide become more remarkable. As described above, it has been demanded to provide a copolyamide which is produced from a diamine component including p-xylylenediamine and a dicarboxylic acid component and has excellent properties and stable quality.

PRIOR ART DOCUMENTS

Patent Documents

Patent Document 1: JP 54-32458B
Patent Document 2: JP 7-041670A
Patent Document 3: JP 8-259809A
Patent Document 4: JP 48-12390A
Patent Document 5: JP 1-14925B
Patent Document 6: JP 6-207004A
Patent Document 7: JP 7-324130A

DISCLOSURE OF THE INVENTION

Problems to be Solved by the Invention

An object of the present invention is to provide a copolyamide resin for molding which comprises a dicarboxylic acid component and a diamine component containing at least two diamines inclusive of p-xylylenediamine. The copolyamide resin has extremely uniform and stable resin properties and is excellent in any of mechanical properties, heat resistance, chemical and physical properties, and molding properties. The present invention further provides a production method of the copolyamide resin, a resin composition comprising the copolyamide resin, and a molded article of the composition.

Means for Solving the Problems

As a result of extensive research, the inventors have found that a specific copolyamide produced under specific conditions is excellent in any of mechanical properties, heat resistance, chemical and physical properties, and molding properties. The copolyamide comprises a diamine component comprising two or more diamines and comprising 70 mol % or more of a xylylenediamine which comprises 20 mol % or more of p-xylylenediamine and a dicarboxylic acid component comprising 70 mol % or more of a straight-chain aliphatic dicarboxylic acid having 6 to 18 carbon atoms. The copolyamide resin is produced under conditions which prevent the local formation of a copolyamide having an increased p-xylylenediamine content. The present invention is based on this finding.

Thus, the present invention provides:

A copolyamide resin comprising a diamine component which comprises two or more diamines and a dicarboxylic acid component, wherein the diamine component comprises 70 mol % or more of a xylylenediamine which comprises 20 mol % or more of p-xylylenediamine and the dicarboxylic acid component comprises 70 mol % or more of a straight-chain aliphatic dicarboxylic acid having 6 to 18 carbon atoms, and the copolyamide resin contains particles having a major diameter of 50 µm or more in an amount of 1000 particles/g or less, the particles comprising a polyamide having a melting point higher than that of the copolyamide resin by 20° C. or more when measured by a differential scanning calorimetry (DSC);

a copolyamide resin composition comprising 100 parts by weight of the copolyamide resin, 0 to 30 parts by weight of talc, and 10 to 150 parts by weight of an inorganic filler;

a molded article comprising the copolyamide resin composition; and a method of producing a copolyamide resin comprising a diamine component which comprises two or more diamines and a dicarboxylic acid component, wherein the diamine component comprises 70 mol % or more of a xylylenediamine which comprises 20 mol % or more of p-xylylenediamine and the dicarboxylic acid component comprises 70 mol % or more of a straight-chain aliphatic dicarboxylic acid having 6 to 18 carbon atoms, and the method comprises subjecting the diamine component and the dicarboxylic acid component to a polycondensation reaction in the absence of a solvent in a batchwise reaction tank equipped with a partial condenser, and conducting the polycondensation reaction by adding the diamine component to the molten dicarboxylic acid component continuously or intermittently while maintaining an inner pressure of the reaction tank at 0.1 MPaG or higher and a reaction system at a temperature which allows a whole reaction system to be kept in fluid state, and by heating a vapor phase in the reaction tank to a temperature equal to or higher than a melting point of a nylon salt comprising the diamine component and the dicarboxylic acid component before adding 80% of a total amount of the diamine component.

Effects of the Invention

The copolyamide resin of the invention has the following beneficial effects:

(i) the copolyamide resin is excellent in any of mechanical properties, heat resistance, chemical and physical properties, and molding properties and the quality attributable to these properties is very stable;

(ii) since the copolyamide resin is produced by a method wherein the adhesion of the nylon salt and oligomer to the reaction system and the escape of the diamine component by evaporation are prevented, the precise control of the mole balance and the precise control of the degree of polymerization are easy, a copolyamide resin with uniform and good quality is obtained;

(iii) since the copolyamide resin is produced by the polycondensation reaction of the diamine component and the dicarboxylic acid component without using water as a solvent, the yield of the copolyamide resin per volume is large and the reaction time is short;

(iv) since the clogging of partial condenser and the accumulation of polymer in the reaction tank are prevented, the batchwise production can be conducted continuously; and (v) since a highly pressure-resistant polymerization apparatus, a partial condenser with complicated design, and an excessively large heating means are not needed, the production apparatus is inexpensive.

MODE FOR CARRYING OUT THE INVENTION

Examples of the dicarboxylic acid component used in the invention include an aliphatic dicarboxylic acid, such as succinic acid, glutaric acid, adipic acid, pimelic acid, suberic acid, azelaic acid, sebacic acid, undecanedioic acid, and dodecanedioic acid, and aromatic dicarboxylic acid, such as terephthalic acid, isophthalic acid, and 2,6-naphthalenedicarboxylic acid, with adipic acid and sebacic acid being preferred. These acids may be used alone or in combination. The dicarboxylic acid component comprises preferably 70 mol % or more and more preferably 90 mol % or more of adipic acid or sebacic acid.

If the dicarboxylic acid component is sebacic acid, the sulfur atom concentration therein is preferably 1 to 200 ppm, more preferably 10 to 150 ppm, and particularly preferably 20 to 100 ppm. Within the above ranges, the increase in YI of the copolyamide resin during its production is prevented. In addition, the increase in YI during the melt molding of the copolyamide resin is prevented, to give a molded article with low YI.

The sodium atom concentration in sebacic acid is preferably 1 to 500 ppm, more preferably 10 to 300 ppm, and particularly preferably 20 to 200 ppm.

Within the above ranges, its reactivity during the synthesis of the copolyamide resin is good, the molecular weight of the copolyamide resin is easily controlled within an appropriate range, and the amount of an alkali metal compound to be used for controlling the reaction speed of amidation as described below can be reduced. In addition, the increase in viscosity during the melt molding of the copolyamide resin can be prevented, to improve the moldability. Simultaneously, the burning during the molding and processing is prevented, to improve the quality of the obtained molded article. Also, the adherence of degraded resin to a die, which is caused in the die when the copolyamide resin is compounded with glass filler, etc., can be avoided.

A plant-derived sebacic acid is preferably used. Since the plant-derived sebacic acid contains a sulfur compound and a sodium compound as impurity, a copolyamide resin comprising a constitutional unit of the plant-derived sebacic acid has low YI even when an anti-oxidant is not added, to provide a molded article with low YI. The sebacic acid derived from plant is preferably used without being highly purified, reducing the production costs.

The diamine component comprises 70 mol % or more and preferably 90 mol % or more of a xylylenediamine. If the content of the xylylenediamine component is 70 mol % or more, excellent mechanical properties and heat resistance can be obtained. The xylylenediamine comprises 20 mol % or more and preferably 30 mol % or more of p-xylylenediamine. The xylylenediamine preferably comprises two diamines, m-xylylenediamine and p-xylylenediamine, and the content of p-xylylenediamine in the xylylenediamine is preferably 20 to 90 mol %, more preferably 20 to 65 mol %, and still more preferably 30 to 50 mol %. If the content of p-xylylenediamine in the diamine component is within the above ranges, the heat degradation due to heating during the synthesis or molding of the copolyamide resin can be avoided and the moldability is good. If the content of p-xylylenediamine is less than 20 mol %, the crystallization speed of the resulting copolyamide resin is low, thereby deteriorating the moldability, providing a deformed molded article due to insufficient crystallization, and reducing the mechanical strength. The diamine component may further contain other diamine as long as the effect of the invention is not adversely affected. Such other diamine is selected from aliphatic diamines, such as tetramethylenediamine, pentamethylenediamine, hexamethylenediamine, 1,7-diaminoheptane, 1,8-diaminooctane, 1,9-diaminononane, and 1,10-diamino decane; aromatic diamines, such as m-phenylenediamine and p-phenylenediamine; and alicyclic diamines, such as 1,3-bis(aminomethyl)cyclohexane and 1,4-bis(aminomethyl)cyclohexane, and is used in an amount of less than 30 mol % of the total diamine component.

The component for forming the copolyamide resin other than the diamine component and the dicarboxylic acid component may be, but not specifically limited to, lactams, such as caprolactam, valerolactam, laurolactam, and undecalactam; and aminocarboxylic acids, such as 11-aminoundecanoic acid and 12-aminododecanoic acid. These components may be used alone or in combination of two or more.

To prevent the discoloration during the melt polymerization, a phosphorus compound may be added to the copolyamide resin. Examples of the phosphorus compound include a hypophosphorous compound, such as hypophosphorous acid and hypophosphorous salt; a phosphorous compound, such as phosphorous acid, phosphorous salt, and phosphorous ester; and a phosphoric compound, such as phosphoric acid, phosphoric salt, and phosphoric ester. Examples of the hypophosphorous salt include potassium hypophosphite, sodium hypophosphite, calcium hypophosphite, magnesium hypophosphite, manganese hypophosphite, nickel hypophosphite, and cobalt hypophosphite. Examples of the phosphorous salt include potassium phosphite, sodium phosphite, calcium phosphite, magnesium phosphite, manganese phosphite, nickel phosphite, and cobalt phosphite. Examples of the phosphorous ester include methyl phosphite, ethyl phosphite, isopropyl phosphite, butyl phosphite, hexyl phosphite, isodecyl phosphite, decyl phosphite, stearyl phosphite, and phenyl phosphite. Examples of the phosphoric salt include potassium phosphate, sodium phosphate, calcium phosphate, magnesium phosphate, manganese phosphate, nickel phosphate, and cobalt phosphate. Examples of the phosphoric ester include methyl phosphate, ethyl phosphate, isopropyl phosphate, butyl phosphate, hexyl phosphate, isodecyl phosphate, decyl phosphate, stearyl phosphate, and phenyl phosphate. These phosphorus-containing antioxidants may be used alone or in combination. The phosphorus compound can be added to the raw material of the copolyamide resin, i.e., the diamine component or the dicarboxylic acid component or can be added to the reaction system, although not limited thereto. To prevent the aggregation of the phosphorus compound in the copolyamide resin and the abnormal reaction each caused by the heat degradation thereof, an alkali metal compound or an alkaline earth metal compound can be combinedly used. Examples thereof include sodium hydroxide, calcium hydroxide, potassium hydroxide, magnesium hydroxide, and an alkali metal or alkaline earth metal compound of carbonic acid, boric acid, acetic acid, propionic acid, butyric acid, isobutyric acid, crotonic acid, valeric acid, caproic acid, isocaproic acid, enanthic acid, caprylic acid, pelargonic acid, stearic acid, cyclopentanecarboxylic acid, cyclohexanecarboxylic acid, hydrocinnamic acid, γ-phenylbutyric acid, p-phenoxybenzoic acid, o-oxycinnamic acid, o-β-chlorophenyl propionic acid, and m-chlorophenyl propionic acid, although not limited thereto.

The copolyamide resin of the invention contains particles having a major diameter of 50 μm or more which comprise a polyamide having a melting point higher than that of the copolyamide resin by 20° C. or more when measured by a differential scanning calorimetry (DSC) in an amount of 1000 particles/g or less, preferably 800 particles/g or less, and more preferably 600 particles/g or less. Within the above ranges, a copolyamide resin having excellent mechanical properties and heat resistance is obtained.

In the particles having a major diameter of 50 μm or more and comprising a polyamide having a melting point higher than that of the copolyamide resin by 20° C. or more, which are contained in the copolyamide resin in an amount of 1000 particles/g or less, the content of particles having a major diameter of 50 to 99 μm is preferably 500 particles/g or less, the content of particles having a major diameter of 100 to 199 μm is preferably 500 particles/g or less, and the content of particles having a major diameter of 200 μm or longer is preferably 100 particles/g or less. In a more preferred embodiment, the content of particles having a major diameter of 50 to 99 μm is 400 particles/g or less, the content of particles having a major diameter of 100 to 199 μm is 400 particles/g or less, and the content of particles having a major diameter of 200 μm or longer is 80 particles/g or less. In a still more preferred embodiment, the content of particles having a major diameter of 50 to 99 μm is 300 particles/g or less, the content of particles having a major diameter of 100 to 199 μm is 300 particles/g or less, and the content of particles having a major diameter of 200 μm or longer is 60 particles/g or less.

The content of particles comprising a polyamide component having a high melting point in the copolyamide resin is determined by, but not particularly limited to, forming a copolyamide resin melted at a temperature higher than its melting point by 10° C. into a cast film, taking an image of the cast film by a CCD line sensor camera, and image-processing the image using a software.

Generally, the synthesis and mold processing of polyamide is carried out, if not restricted by other factors, at a temperature range of about its melting point to the melting point+20° C. so as to allow the polyamide to sufficiently melt and prevent the heat degradation. In the production of a copolyamide resin having the composition specified in the invention, a polyamide having a melting point higher than that of the intended copolyamide resin by 20° C. or more is likely to be by-produced. The high melting point polyamide remains in the system not melted during the synthesis and molding process. The molded article produced from the heterogeneous product containing the high melting point polyamide has deteriorated, uneven mechanical properties and heat resistance because of the dispersed high melting point polyamide. Even if the temperature of molding process is raised enough to sufficiently melt the high melting point polyamide, a completely homogeneous system is difficult to obtain, and the copolyamide resin is excessively heat-degraded to reduce its mechanical properties and heat resistance.

The number and size of the high melting point particles in the copolyamide resin can be determined by: producing a molded article, such as shaped article, film, sheet, and bottle, by a known injection molding or extrusion molding while setting the temperature of a mold or touch roll low so as to allow the molten copolyamide resin to be cooled and solidified in amorphous state, and visually observing the molded article or image-processing the image of molded article taken by a CCD camera using a image processing software. The melting point of particles in the obtained molded article can be determined by DSC analysis of the particles collected from the molded article by cutting, etc., thereby confirming whether the particle are the high melting point foreign matters or not.

The relative viscosity of the copolyamide resin at 25° C. is preferably 1.80 to 4.20, more preferably 1.90 to 3.50, and still more preferably 1.95 to 3.00 when measured in a 96% concentrated sulfuric acid at a concentration of 1 g/100 mL. If being less than 1.80, the molded article of the copolyamide resin has insufficient mechanical strength as well as unfavorably has deteriorated resistance to water absorption, chemical resistance, and resistance to heat aging. In addition, the melt viscosity is extremely low, likely to cause die swelling, uneven melting, and mold flash during the melt processing and molding. If being 1.80 or more, the molded article of the copolyamide resin has sufficient mechanical strength and improved resistance to water absorption, chemical resistance, and resistance to heat aging.

The copolyamide resin having a relative viscosity of 1.80 or more can be easily obtained by continuing the melt polymerization until the relative viscosity reaches the predetermined value. However, if the melt polymerization time (reaction time) is excessively long, the polyamide molecule may be damaged or an abnormal reaction (formation of three-dimensional polymer), such as non-linear molecular growth, may occur, resulting in the formation of discolored product and gel. In particular, the abnormal reaction is difficult to avoid when the relative viscosity exceeds 4.20. In addition, the extremely high melt viscosity unfavorably makes the molding process difficult. The copolyamide resin containing a large amount of the discolored product and gel shows an abnormal increase in the viscosity and has a low stability in the viscosity during its holding in a molten state, thereby significantly deteriorating the moldability, in addition, the resulting molded article is poor in the properties, such as resistance to water absorption, chemical resistance, and resistance to heat aging.

The copolyamide resin is produced by the polycondensation of the diamine component and the dicarboxylic acid component in the absence of a solvent in a batchwise reaction tank equipped with a partial condenser, in which the diamine component is added to the molten dicarboxylic acid component continuously or intermittently while maintaining the inner pressure of the reaction tank constant within a range of 0.1 MPaG or higher and keeping the reaction system at a temperature which allows a whole reaction system to be kept in fluid state, and the vapor phase in the reaction tank is heated to a temperature equal to or higher than the melting point of the nylon salt comprising the raw materials before 80% of the total amount of the diamine component is added.

In the production method of the invention, a batchwise reaction tank equipped with a stirring device and a partial condenser and designed to withstand pressure is used. To control the temperature of vapor phase in the reaction tank, the pipe connecting the vapor phase in the reaction tank and the partial condenser is preferably equipped with an appropriate heat insulating means or heating means, such as a heating medium jacket. To prevent the escape of the diamine component and the dicarboxylic acid component by evaporation, the heat transfer surface of the partial condenser is preferably temperature-controllable.

The mole balance of raw materials to be charged is not specifically limited, because a copolyamide resin having a desired mole balance (inclusive of diamine component rich, dicarboxylic acid component rich, and equimolar) can be produced in the production method of the invention. The mole balance of raw materials to be charged is controlled, for example, by metering the molten dicarboxylic acid component together with the melting tank, supplying the molten dicarboxylic acid to the reaction tank, and adding the diamine component in the reserve tank to the reaction system while metering the amount being added. The diamine component and the dicarboxylic acid component can be metered by means of a weighing meter, such as a load cell and a balance.

The method of producing the copolyamide resin of the invention will be described below in detail. First, the dicarboxylic acid component is charged into the reaction tank and then the inner pressure of the reaction tank is raised to a preset level equal to or higher than 0.1 MPaG and kept at 0.1 MPaG or higher. In view of avoiding the discoloration of the copolyamide resin by oxidation, it is preferable to replace the inner atmosphere of the reaction tank sufficiently with an inert gas, such as nitrogen, before charging the dicarboxylic acid component into the reaction tank. It is also preferable to melt the dicarboxylic acid in an inert gas atmosphere. The dicarboxylic acid component may be melted in the reaction tank by heating to its melting point or higher. Alternatively, the dicarboxylic acid component may be melted in a different tank for only melting (melting tank) by heating and then the molten dicarboxylic acid component is charged into the reaction tank. In view of increasing the working efficiency of the reaction tank, the use of the melting tank is recommended.

It is recommended to raise the inner pressure of the reaction tank to the preset pressure mentioned above before initiating the addition of the diamine component to the dicarboxylic acid component in the reaction tank. After reaching the preset pressure, it is preferred to keep the inner pressure of the reaction tank constant at the preset pressure. If the pressure varies during the reaction, the saturated steam temperature and the linear velocity of the gas passing through the partial condenser also vary. Therefore, the separation ability of the partial condenser between the condensation water and the raw materials is reduced, and the escape of the raw materials, particularly the diamine component, from the reaction system is difficult to prevent, thereby making it difficult to control the mole balance. Thus, it is not recommended to raise the inner pressure to the preset pressure after initiating the addition of the diamine component. The inner pressure of the reaction tank may be raised by introducing an inert gas, such as nitrogen, or steam. The preset pressure is selected preferably such that the saturated steam temperature at the inner pressure of the reaction tank during the addition of the diamine is 150° C. or lower. The preset pressure depends upon the types of the diamine component and the dicarboxylic acid component to be used, and it is preferably 0.1 to 0.4 MPaG.

After the inner pressure of the reaction tank reaches the preset pressure, the diamine component is added to the dicarboxylic acid component continuously or intermittently while keeping the inner pressure constant at the preset pressure and maintaining the reaction system at a temperature enough to keep the whole reaction system in fluid state. During the addition of the diamine component to the dicarboxylic acid component, the dicarboxylic acid is heated preferably to 150° C. or higher within which the amidation reaction is allowed to proceed, and simultaneously, the reaction system is kept preferably at a temperature which allows the by-produced oligomer and/or low molecular weight polyamide to melt, thereby maintaining the whole reaction system in fluid state. The addition is carried out generally at 180 to 310° C. and preferably at 180 to 290° C.

The addition is carried out by adding the diamine component to the molten dicarboxylic acid component in the reaction tank continuously or intermittently under stirring while gradually raising the temperature of the reaction mixture so as to maintain the whole reaction mixture in fluid state.

The temperature raising rate depends upon the heat of amidation reaction, the latent heat of evaporation of the condensation water, and the heat supplied. Therefore, the addition speed of the diamine component is suitably regulated so that the temperature of the reaction mixture at the completion of the addition is preferably equal to or higher than the melting point of the copolyamide resin but less than (the melting point+35° C.), more preferably equal to or higher than the melting point of the copolyamide resin but less than (the melting point+15° C.), and still more preferably equal to or higher than (the melting point+5° C.) but less than (the melting point+10° C.). The melting point referred to herein is the temperature of heat absorption peak attributable to the heat of fusion of crystal which is observed in differential scanning calorimetry (DSC), etc. The melting point of the reaction system can be determined by DSC, etc.

In the present invention, the temperature of vapor phase in the reaction tank is raised to a temperature equal to or high than the melting point of the nylon salt of raw materials before adding 80% of the total amount of the diamine component, preferably before adding 70% of the total amount of the diamine component, and more preferably before adding 60% of the total amount of the diamine component In the process of adding the diamine component, in addition to the condensation water being eliminated, the vapors of the diamine and the dicarboxylic acid exist in the vapor phase in the reaction tank. Since the dew points of the xylylenediamine and the dicarboxylic acid are higher than that of water, the xylylenediamine and the dicarboxylic acid are easily condensed on the inner wall of the apparatus to form a nylon salt. If the temperature of vapor phase is lower than the melting point of the nylon salt, the solid nylon salt is accumulated on the wall surrounding the vapor phase. The amidation of the accumulated nylon salt results in a polyamide oligomer having a high melting point, making the accumulation visible. If a copolyamide resin having p-xylylenediamine in a content higher than intended is formed locally and enters into the reaction liquid during the production process, the properties of the resulting copolyamide resin, such as mechanical properties and heat resistance, becomes uneven.

Since the nylon salt is generally somewhat soluble in water, it may be effective in some cases for preventing the accumulation of nylon salt to increase the returning amount of the condensation water in the production process. However, the additional heat and additional time for raising the temperature are needed for re-evaporating the returned water. In addition, the polyamide is degraded by the partial heating due to the excessive heat transfer. In the production of the copolyamide resin of the invention which contains p-xylylenediamine units, the nylon salt is less soluble in water. Therefore, the increase of the returning amount of water is not so effective. Under the reaction conditions for increasing the returning amount of water, the temperature of returning water is lowered to decrease the water solubility of nylon salt, this making it difficult to obtain the intended effect. Therefore, it has been difficult to prevent the high melting point polyamide from being accumulated in the apparatus and entering into the copolyamide resin. In the method of producing the copolyamide resin of the invention, the temperature of the returning water is increased because the inside of the reaction tank is pressurized, this in turn increasing the water solubility of nylon salt. However, since the content of water in the returning liquid is small, it is difficult to dissolve or wash away the nylon salt entirely only by the water in the returning liquid.

As a result of extensive research in view of preventing the accumulation of the high melting point polyamide in the apparatus during its production and the inclusion thereof into the copolyamide resin, it has been surprisingly found that the accumulation can be dramatically and effectively prevented by melting the nylon salt and washing away the molten nylon salt by a returning liquid mainly comprising the diamine before completing the addition of diamine, in place of the method conventionally employed, i.e., by washing away the nylon salt by the condensation water being returned to the system. The invention is based on this finding.

Thus, in the present invention, the temperature of the vapor phase in the reaction tank is raised to a temperature equal to or higher than the melting point of the nylon salt comprising the raw materials before 80% of the total amount of the diamine component is added. The melting point of the nylon salt can be determined by the method described below. By raising the temperature to the melting point of the nylon salt or higher before the 80% addition, the accumulated nylon salt melts and the molten nylon salt is rapidly returned to the reaction liquid together with the returning liquid. Since the returned nylon salt is uniformly dispersed throughout the reaction liquid in the subsequent production steps, the copolyamide resin with excellent properties are produced without quality variation. Even if the vapor phase reaches a temperature equal to or higher than the melting point of the nylon salt after the 80% addition, the effect is obtained to some extent if the addition is still not completed. However, since the viscosity of the reaction liquid increases as the polycondensation proceeds, it is difficult to uniformly disperse the nylon salt. Therefore, the nylon salt not completely reacted is likely to be included in the resulting copolyamide resin as the high melting point polyamide. If the vapor phase reaches a temperature equal to or higher than the melting point of the nylon salt after the completion of the diamine addition, the washing effect by the returning liquid is not obtained and the viscosity of the reaction liquid becomes extremely high, making the inclusion of the high melting point polyamide into the copolyamide resin unavoidable.

The condensation water which is eliminated as the condensation reaction proceeds is removed out of the reaction system by distillation through a partial condenser and then a cooler. The inner temperature of the partial condenser is preferably controlled to 150° C. or lower. The diamine component and the dicarboxylic acid component evaporated together with the condensation water are separated from the steam in the partial condenser and returned to the reaction tank. In the continuous production wherein the inner temperature of the partial condenser is set at higher than 150° C., the polyamide oligomer not dissolved in the condensation water accumulates in the partial condenser. The repeated batchwise production increases the amount of the accumulated oligomer in the partial condenser and finally clogs the partial condenser, thereby making the continuous batchwise production difficult.

In view of the efficient removal of the condensation water which is eliminated as the condensation reaction proceeds out of the reaction system by distillation, the inner temperature of the partial condenser is preferably less than 150° C. and within a range from the saturated steam temperature to a temperature 5° C. higher than the saturated steam temperature. If the inner temperature of the partial condenser is higher than the saturated steam temperature, the returning amount from the partial condenser decreases and the effect of washing away the nylon salt or oligomer adhered to the partial condenser cannot be expected. If the inner temperature of the partial condenser is lower than the saturated steam temperature, the amount of the condensation water being returned is increased. Since a large amount of the condensation water returned to the reaction system decreases the temperature of the reaction mixture, additional heat energy is needed. The temperature of vapor phase is also decreased to make the accumulation of the nylon salt and oligomer remarkable and the inclusion of the high melting point polyamide into the copolyamide resin unavoidable. In addition, the polymer solidifies and accumulates due to the evaporation latent heat of water, therefore, the molten state cannot be maintained in some cases. It is preferable to suitably select the pressure of the reaction tank so as to achieve an optimum inner temperature of the partial condenser. If the inner pressure of the reaction tank is 0.3 MPaG, the inner temperature of the partial condenser can be regulated within a range of 143° C. to 148° C.

After completing the addition of the diamine component, the inner pressure of the reaction tank is reduced to atmospheric pressure or lower. The pressure is reduced preferably to less than atmospheric pressure so as to remove the steam in the vapor phase from the reaction system, this shifting the amidation equilibrium to the product side to further increase the degree of polymerization. During the pressure reduction, the temperature is maintained so as to keep the whole reaction system in fluid state. The speed of decreasing the pressure is selected so as to avoid the foaming of the produced polyamide and is preferably 0.1 to 0.6 MPa/h, although depending upon the size of the reaction tank and the pressure before reducing. If higher than 0.6 MPa/h, the liquid surface rises due to foaming and the polymer adheres to the side wall of the reaction tank, stirring blade, etc. Since the adhered polymer does not dissolve in the subsequent batchwise production, the adhered amount increases with repeating batchwise production and the adhered polymer is exposed to heat. If the adhered polymer removes from the wall or stirring blade and enters into the polymer, the quality of the resultant copolyamide is reduced or the stirring blade may be broken. If lower than 0.1 MPa/h, the disadvantages, such as the yellowing of the polyamide due to increased heat history and the reduction of productivity, are caused.

After completing the addition of the diamine component and before decreasing the pressure, the inner pressure of the reaction tank is kept at the preset pressure preferably for 5 min to 3 h and more preferably 10 min to one hour, while maintaining the temperature so as to keep the whole reaction system in fluid state. At the initial stage of adding the diamine component, the carboxyl group exists in large excess to the diamine component and the reaction speed, i.e., the fixing speed of the diamine component is extremely high. Since a considerable amount of the carboxyl group is consumed at the time the addition is completed, the fixing speed of the diamine component is extremely low as compared with that at the initial stage of the addition. The efficiency of stirring the reaction mixture decreases with increasing degree of polymerization, this being disadvantageous for the fixation of the diamine component. The diamine component not fixed remains in the reaction mixture or in the vapor phase in the reaction system. The diamine component condensed in the partial condenser returns to the reaction mixture. By maintaining at the preset pressure for at least 5 min after completing the addition of the diamine component, the remaining diamine component is fixed and the mole balance of the initial charge is precisely reflected in the mole balance of the produced polyamide. The upper limit of the time for maintaining at the preset pressure is not absolutely determined because it depends upon the degree of the fixation of the diamine component. However, no additional effect is obtained by maintaining the preset pressure longer than needed after completing the fixation of the diamine component, instead, the disadvantage, such as increase in heat history and reduction in productivity, is caused. Therefore, the preset pressure is maintained generally for 3 h or less.

After reducing the pressure, the produced polyamide is discharged from the reaction tank preferably under pressure of an inert gas, such as nitrogen. In the present invention, since the nylon salt and oligomer little remain in the reaction tank after discharging the produced polyamide, the reaction tank is readily used for the next batchwise reaction, thereby enabling the continuous batchwise production. The polyamide thus obtained may be subjected to a solid state polymerization for further polymerization to obtain a polyamide with a higher molecular weight. Alternatively, the polyamide obtained may be supplied to a continuous polymerization apparatus in molten state for further polymerization to obtain a polyamide with a higher molecular weight.

The copolyamide resin composition of the invention comprises the copolyamide resin mentioned above, talc and inorganic filler. The inorganic filler can be selected from those generally used in known resin compositions without specific limitation, for example, selected from powdery filler, fibrous filler, granular filler, and flaky filler. The inorganic filler may be used in combination. In view of mechanical properties, etc., the blending amount of the inorganic filler is preferably 10 to 150 parts by weight per 100 parts by weight of the copolyamide resin.

Examples of the fibrous filler include glass fiber, whisker of potassium titanate and calcium sulfate, carbon fiber, and alumina fiber. The powdery filler has a particle size of preferably 100 μm or less and more preferably 80 μm or less, and examples thereof include kaolinite, silica, carbonate, such as calcium carbonate and magnesium carbonate, sulfate, such as calcium sulfate and magnesium sulfate, sulfide, and metal oxide.

The talc may be added to the copolyamide resin composition to further accelerate the crystallization. The talc has a particle size of preferably 100 μm or less and more preferably 80 μm or less and is blended preferably in an amount of 30 parts by weight or less per 100 parts by weight of the copolyamide resin. If exceeding 30 parts by weight per 100 parts by weight of the copolyamide resin, the flowability during molding the composition is poor and the mechanical properties of the obtained molded article is poor.

The copolyamide resin composition of the invention may be blended with another resin, such as nylon 6, nylon 66, nylon 6,66, polyester, and olefin resin as long as the object of the invention is adversely affected. In addition, the copolyamide resin composition of the invention may be blended with an additive, for example, a plate inorganic filler prepared by treating kaolinite, mica, or montmorillonite with an organic compound; an impact strength modifier, such as elastomers; a nucleating agent; a lubricant, such as an aliphatic carboxylic acid amide and a metal salt of aliphatic carboxylic acid; an antioxidant, such as a copper compound, an organic or inorganic halogen compound, a hindered phenol compound, a hindered amine compound, a hydrazine compound, a sulfur-containing compound, and a phosphorus-containing compound; a heat stabilizer; an anti-discoloration agent; an ultraviolet absorber, such as a benzotriazole compound; a mold release agent; a plasticizer; a colorant; a flame retardant; an oxygen scavenger, such as a cobalt-containing compound; and an anti-gelling agent for the copolyamide resin, such as an alkali compound.

The copolyamide resin or the copolyamide resin composition of the invention can be made into a molded article by an injection molding, a blow molding, an extrusion molding, a compression molding, a stretching method, or a vacuum forming. The molded article may be in the form of shaped article for use as engineering plastics and also in the form of film, sheet, hollow container, fiber, and tube. The molded article of the invention is suitable for used as industrial materials and houseware.

EXAMPLES

The present invention is described in more detail with reference to the examples and comparative examples. However, it should be noted that the scope of the present invention is not limited by the following examples and comparative examples. Each method for analysis is described below.

(1) Relative Viscosity

In 100 ml of a 96% sulfuric acid, one gram of a polyamide accurately weighed was dissolved under stirring at 20 to 30° C. Immediately after completely dissolving, 5 cc of the solution was taken in a Cannon-Fenske viscometer. After leaving for 10 min in a thermostatic bath at 25° C., the falling speed (t) of the solution was measured. Then, the falling speed ($t_0$) of the 96% sulfuric acid was measured in the same manner. The relative viscosity was calculated from the measured values of t and $t_0$ according to formula (A):

$$\text{Relative Viscosity} = t/t_0 \quad (A).$$

(2) Terminal Amino Group Concentration

In 30 cc of a mixed solution of phenol/ethanol=4/1 by volume, 0.3 to 0.5 g of a polyamide resin accurately weighed was dissolved under stirring at 20 to 30° C. After completely dissolving, the terminal amino group concentration was determined by a neutralization titration using a N/100 hydrochloric acid under stirring.

(3) Terminal Carboxyl Group Concentration

In 30 cc of benzyl alcohol, 0.3 to 0.5 g of a copolyamide resin accurately weighed was dissolved in nitrogen stream at 160 to 180° C. under stirring. After completely dissolving, the solution was cooled to 80° C. or lower in nitrogen stream. After adding 10 cc of methanol under stirring, the terminal carboxyl group concentration was determined by a neutralization titration using a N/100 aqueous solution of sodium hydroxide.

(4) Number Average Molecular Weight

Calculated from the following formula:

$$\text{Number Average Molecular Weight} = 2/([NH_2] + [COOH])$$

wherein $[NH_2]$ is the terminal amino group concentration (μeq/g and [COOH] is the terminal carboxyl group concentration (μeq/g).

(5) Yellowness (YI)

According to JIS K7103, the tristimulus values X, Y, and Z of the XYZ color system due to the reflection on a pelletized sample were determined using a color difference meter (ZE-2000 manufactured by Nippon Denshoku Industries Co., Ltd.).

(6) Melting Point

Measured using a differential scanning calorimetry (DSC-60 manufactured by Shimadzu Corporation) at a temperature rising speed of 10° C./min in nitrogen stream.

(7) Preparation of Nylon Salt as Raw Material of Copolyamide Resin and Measurement of its Melting Point A mixture of a diamine and a dicarboxylic acid (1:1 by mole) was added to the water in a flask in an amount not saturating the resultant solution and dissolved completely under stirring while raising the temperature to 80° C., thereby preparing an aqueous solution of nylon salt. The complete solution was poured into an evaporator and the water was evaporated off in a hot water bath under reduced pressure. The obtained nylon salt was vacuum-dried at 90° C. overnight and then measured for the melting point by DSC. If two or more melting peaks appear, the temperature of the peak at higher melting point side is employed as the melting point of nylon salt.

(8) Measurement of Particles in Copolyamide Resin

A copolyamide was formed into film by using a corotating twin-screw extruder (Model BTN-25-S2-24-L manufactured by Plabor Co., Ltd., screw diameter: 25 mmφ, T-die width: 150 mm) under the following conditions. The number and size of particles in the obtained film was on-line determined using a CCD line sensor camera and an image processing software.

Temperature of barrel and T-die: 10° C. higher than the melting point of copolyamide resin;
Rotation speed of screw: 40 rpm;
Rotation speed of feed screw: 24 rpm;
Temperature of cooling roll: 80° C.;
Speed of cooling roll: 3.2 m/min;
Speed of take-up roll: 3.3 m/min;
Film thickness: 50 μm;
CCD line sensor camera: MLY5000F manufactured by Mamiya-OP Co., Ltd. (pixel number: 5000, clock frequency: 40 MHz, scan rate:131 μs/scan, field width: 125 mm, resolution in width direction: 25 μm, resolution in scanning direction: 7 μm, automatic dimmer using halogen lighting device); and Image processing software: a defect detection system GX70W manufactured by Misuzuerie Co., Ltd. Dark defects were detected. The visual observation taken in advance confirmed that the results were in agreement with the results by visual observation.

(9) Mechanical Properties of Molded Article

A sample was melted at a temperature 20° C. higher than its melting point and injection-molded using an injection molding machine (Fanuc 100α) under the conditions of an injection pressure of 600 kgf/cm², an injection time of 1.0 s, and a mold temperature of 80° C. The obtained injection-molded article was annealed in an hot air dryer at 160° C. for one hour and then the following tests were carried out in absolutely dried condition. Each test was carried out on ten samples, and the average values and the standard deviation were calculated.

|  | Size of Sample | Apparatus and Condition | Test Method |
|---|---|---|---|
| Bending test | 6 mm × 12 mm × 120 mm | TENSILON UTM-5T (Orientec) | ASTM D790 |
| Heat deformation temperature | 6 mm × 12 mm × 120 mm | HDT and VSPT TESTER (Toyo Seiki Seisaku-Sho) | ASTM D648 Load: 4.6 kgf/cm² and 18.5 kgf/cm² |

Example 1

An oil-jacketed 50-L stainless reaction tank was used for the synthesis of the copolyamide resin, which was equipped with a partial condenser through which an oil with its temperature regulated was to be passed, a total condenser, a stirring device, a nitrogen gas inlet, and an opening for dropping diamine. To control the temperature of vapor phase in the reaction tank, the wall surrounding the vapor phase was kept at 230° C. during the synthesis of the copolyamide resin by an electric heater for temperature control which was disposed on the outer wall of the reaction tank not equipped with the oil jacket and an oil jacket disposed on the pipe connected to the partial condenser. Into the reaction tank, 15.000 kg of adipic acid (purity: 99.85 wt %) accurately weighed was charged and the inner atmosphere of the reaction tank was thoroughly replaced with nitrogen. The temperature was raised by passing a heating medium at 300° C. through the jacket to melt the adipic acid into fluid state under stirring. During the melting, the supply of nitrogen into the reaction tank was started to increase the inner pressure to 0.4 MPaG. When the temperature reached 190° C., 13.909 kg of a mixed xylylenediamine (purity: 99.95 wt %) of 70 mol % of m-xylylenediamine and 30 mol % of p-xylylenediamine was added dropwise over 2 h while stirring the molten adipic acid. During the addition, the temperature was continuously raised by controlling the heating so as to allow the inner temperature to reach 265° C. at the time the dropwise addition of the mixed xylylenediamine was completed, and the inner pressure was kept at 0.4 MPaG. The water being evaporated was removed from the reaction system through the partial condenser having its inner temperature kept at 150° C. and the cooler. The temperature of vapor phase in the reaction tank was gradually raised during the addition and reached a temperature higher than the melting point (227° C.) of the nylon salt composed of the mixed xylylenediamine and adipic acid when 70% of the total amount of diamine was added dropwise. After completing the dropwise addition of the mixed xylylenediamine, the inner pressure was kept at 0.4 MPaG for 15 min by raising the temperature at a temperature raising rate of 0.2° C./min while continuing the stirring. The inner pressure was reduced to 80 kPaA at a rate of 0.6 MPa/h and kept at 80 kPaA for 5 min. Then, the heating was stopped and the product was discharged from a nozzle at a lower portion of the reaction tank in the form of strand under pressure of nitrogen, which was then water-cooled and pelletized to obtain an amorphous copolyamide resin. The obtained copolyamide resin had a relative viscosity of 2.12, a number average molecular weight of 15800, a mole balance (diamine/dicarboxylic acid) of 0.994, YI of −5, and a melting point of 258° C. The batchwise reaction was continuously repeated 10 times in total. The relative viscosity was 2.06 to 2.14, the number average molecular weight was 14,800 to 16,000, the mole balance was 0.993 to 0.995, and YI was −6 to −3, showing a good stability. After 10 continuous batchwise reactions, no solid matter was detected in the reaction tank and in the partial condenser. The obtained copolyamide resin was made into film, which was then measured for particles. The number of particles detected was 104 particles/g for particles having a size of 50 μm or more, 53 particles/g for particles having a size of 50 to 99 μm, 42 particles/g for particles having a size of 100 to 199 μm, and 9 particles/g for particles having a size of 200 μm or more, providing a good film appearance with extremely small amount of particles. The particles taken by cutting off from the film were measured for the melting point. In addition to the melting point 258° C. of the copolyamide resin, another melting point was observed at 282° C. The obtained copolyamide resin was molded into a molded article, which was then evaluated for properties. The bending modulus was 4280 MPa with a standard deviation of 18, the bending strength was 174 MPa with a standard deviation of 1, and the heat deformation temperature was 174° C. with a standard deviation of 1, showing that the molded article had excellent mechanical properties and heat resistance and good quality stability.

Example 2

A copolyamide resin was synthesized using the same reaction tank under the same conditions as in Example 1 except for keeping the inner pressure at 0.2 MPaG and removing the evaporated water from the reaction system through the partial condenser having its inner temperature kept at 120 to 124° C. and the cooler. The obtained copolyamide resin had a relative viscosity of 2.09, a number average molecular weight of 15300, a mole balance (diamine/dicarboxylic acid) of 0.994, YI of −4, and a melting point of 258° C. The batchwise reaction was continuously repeated 10 times in total. The relative viscosity was 2.05 to 2.12, the number average molecular weight was 14,700 to 15,800, the mole balance was 0.993 to 0.995, and YI was −6 to −3, showing a good stability. After 10 continuous batchwise reactions, no solid matter was detected in the reaction tank and in the partial condenser. The obtained copolyamide resin was made into film, which was then measured for particles. The number of particles detected was 147 particles/g for particles having a size of 50 μm or more, 75 particles/g for particles having a size of 50 to 99 μm, particles/g for particles having a size of 100 to 199 μm, and 15 particles/g for particles having a size of 200 μm or more, providing a good film appearance with extremely small amount of particles. The particles taken by cutting off from the film were measured for the melting point. In addition to the melting point 258° C. of the copolyamide resin, another melting point was observed at 280° C. The obtained copolyamide resin was molded into a molded article, which was then evaluated for properties. The bending modulus was 4265 MPa with a standard deviation of 15, the bending strength was 174 MPa with a standard deviation of 1, and the heat deformation temperature was 175° C. with a standard deviation of 1, showing that the molded article had excellent mechanical properties and heat resistance and good quality stability.

Example 3

A copolyamide resin was synthesized using the same reaction tank under the same conditions as in Example 1 except that a mixed xylylenediamine (purity: 99.95 wt %) of 60 mol % of m-xylylenediamine and 40 mol % of p-xylylenediamine was used; the temperature of the reaction liquid was continuously raised during the addition of the diamine so as to allow the inner temperature to reach 275° C. at the time the dropwise addition of the mixed xylylenediamine was completed; and the wall surrounding the vapor phase was kept at 240° C. so as to allow the temperature of vapor phase in the reaction tank to reach a temperature higher than the melting point (230° C.) of the nylon salt composed of the mixed xylylenediamine and adipic acid when 70% of the total amount of diamine was added dropwise. The obtained copolyamide resin had a relative viscosity of 2.10, a number average molecular weight of 15500, a mole balance (diamine/dicarboxylic acid) of 0.994, YI of −3, and a melting point of 269° C. The batchwise reaction was continuously repeated 10 times in total. The relative viscosity was 2.07 to 2.13, the number average molecular weight was 14,900 to 15,900, the mole balance was 0.993 to 0.995, and YI was −5 to −1, showing a good stability. After 10 continuous batchwise reactions, no solid matter was detected in the reaction tank and in the partial condenser. The obtained copolyamide resin was made into film, which was then measured for particles. The number of particles detected was 261 particles/g for particles having a size of 50 μm or more, 133 particles/g for particles having a size of 50 to 99 μm, 102 particles/g for particles having a size of 100 to 199 μm, and 26 particles/g for particles having a size of 200 μm or more, providing a good film appearance with extremely small amount of particles. The particles taken by cutting off from the film were measured for the melting point. In addition to the melting point 269° C. of the copolyamide resin, another melting point was observed at 293° C. The obtained copolyamide resin was molded into a molded article, which was then evaluated for properties. The bending modulus was 4270 MPa with a standard deviation of 23, the bending strength was 172 MPa with a standard deviation of 1, and the heat deformation temperature was 179° C. with a standard deviation of 2, showing that the molded article had excellent mechanical properties and heat resistance and good quality stability.

Example 4

A copolyamide resin was synthesized using the same reaction tank under the same conditions as in Example 1 except that a mixed xylylenediamine (purity: 99.95 wt %) of 50 mol % of m-xylylenediamine and 50 mol % of p-xylylenediamine was used; the temperature of the reaction liquid was continuously raised during the addition of the diamine so as to allow the inner temperature to reach 285° C. at the time the dropwise addition of the mixed xylylenediamine was completed; and the wall surrounding the vapor phase was kept at 250° C. so as to allow the temperature of vapor phase in the reaction tank to reach a temperature higher than the melting point (238° C.) of the nylon salt composed of the mixed xylylenediamine and adipic acid when 75% of the total amount of diamine was added dropwise. The obtained copolyamide resin had a relative viscosity of 2.11, a number average molecular weight of 15700, a mole balance (diamine/dicarboxylic acid) of 0.993, YI of −1, and a melting point of 278° C. The batchwise reaction was continuously repeated 10 times in total. The relative viscosity was 2.06 to 2.16, the number average molecular weight was 14,800 to 16,300, the mole balance was 0.992 to 0.994, and YI was −3 to 1, showing a good stability. After 10 continuous batchwise reactions, no solid matter was detected in the reaction tank and in the partial condenser. The obtained copolyamide resin was made into film, which was then measured for particles. The number of particles detected was 632 particles/g for particles having a size of 50 μm or more, 319 particles/g for particles having a size of 50 to 99 μm, 278 particles/g for particles having a size of 100 to 199 μm, and 35 particles/g for particles having a size of 200 μm or more, providing a good film appearance with extremely small amount of particles. The particles taken by cutting off from the film were measured for the melting point. In addition to the melting point 278° C. of the copolyamide resin, another melting point was observed at 302° C. The obtained copolyamide resin was molded into a molded article, which was then evaluated for properties. The bending modulus was 4263 MPa with a standard deviation of 28, the bending strength was 171 MPa with a standard deviation of 2, and the heat deformation temperature was 189° C. with a standard deviation of 2, showing that the molded article had excellent mechanical properties and heat resistance and good quality stability.

Example 5

A copolyamide resin was synthesized using the same reaction tank under the same conditions as in Example 1 except that 15.135 kg of sebacic acid (purity: 99.70 wt %, sulfur atom concentration: 30 ppm, sodium atom concentration: 54 ppm) was charged as the dicarboxylic acid component; 10.100 kg of a mixed xylylenediamine (purity: 99.95 wt %) of 70 mol % of m-xylylenediamine and 30 mol % of p-xylylenediamine was added dropwise as the diamine component; the temperature of the reaction liquid was continuously raised during the addition of the diamine so as to allow the inner temperature to reach 250° C. at the time the drop wise addition of the diamine was completed; and the wall surrounding the vapor phase was kept at 230° C. so as to allow the temperature of vapor phase in the reaction tank to reach a temperature higher than the melting point (191° C.) of the nylon salt composed of the mixed xylylenediamine and sebacic acid when 35% of the total amount of diamine was added dropwise. The obtained copolyamide resin has a relative viscosity of 2.05, a number average molecular weight of 14900, a mole balance (diamine/dicarboxylic acid) of 0.994, YI of −5, and a melting point of 214° C. The batchwise reaction was continuously repeated 10 times in total. The relative viscosity was 2.00 to 2.13, the number average molecular weight was 14200 to 15900, the mole balance was 0.993 to 0.995, and YI was −7 to −3, showing a good stability. After 10 continuous batchwise reactions, no solid matter was detected in the reaction tank and in the partial condenser. The obtained copolyamide resin was made into film, which was then measured for particles. The number of particles detected was 198 particles/g for particles having a size of 50 μm or more, 102 particles/g for particles having a size of 50 to 99 μm, 75 particles/g for particles having a size of 100 to 199 μm, and 21 particles/g for particles having a size of 200 μm or more, providing a good film appearance with extremely small amount of particles. The particles taken by cutting off from the film were measured for the melting point. In addition to the melting point 214° C. of the copolyamide resin, another melting point was observed at 250° C. The obtained copolyamide resin was molded into a molded article, which was then evaluated for properties. The bending modulus was 2920 MPa with a standard deviation of 14, the bending strength was 135 MPa with a standard deviation of 1, and the heat deformation temperature was 145° C. with a standard deviation of 2, showing that the quality stability was also very good.

Example 6

A copolyamide resin was synthesized using the same reaction tank under the same conditions as in Example 5 except that a mixed xylylenediamine (purity: 99.95 wt %) of 60 mol % of m-xylylenediamine and 40 mol % of p-xylylenediamine was used; and the wall surrounding the vapor phase was kept at 230° C. so as to allow the temperature of vapor phase in the reaction tank to reach a temperature higher than the melting point (197° C.) of the nylon salt composed of the mixed xylylenediamine and sebacic acid when 40% of the total amount of diamine was added dropwise. The obtained copolyamide resin had a relative viscosity of 2.07, a number average molecular weight of 15100, a mole balance (diamine/dicarboxylic acid) of 0.994, YI of −5, and a melting point of 223° C. The batchwise reaction was continuously repeated 10 times in total. The relative viscosity was 2.04 to 2.10, the number average molecular weight was 14700 to 15500, the mole balance was 0.993 to 0.995, and YI was −7 to −3, showing a good stability. After 10 continuous batchwise reactions, no solid matter was detected in the reaction tank and in the partial condenser. The obtained copolyamide resin was made into film, which was then measured for particles. The number of particles detected was 217 particles/g for particles having a size of 50 μm or more, 114 particles/g for particles having a size of 50 to 99 μm, 79 particles/g for particles having a size of 100 to 199 μm, and 24 particles/g for particles having a size of 200 μm or more, providing a good film appearance with extremely small amount of particles. The particles taken by cutting off from the film were measured for the melting point. In addition to the melting point 223° C. of the copolyamide resin, another melting point was observed at 260° C. The obtained copolyamide resin was molded into a molded article, which was then evaluated for properties. The bending modulus was 2900 MPa with a standard deviation of 12, the bending strength was 134 MPa with a standard deviation of 1, and the heat deformation temperature was 152° C. with a standard deviation of 2, showing that the quality stability was also very good.

Example 7

A copolyamide resin was synthesized using the same reaction tank under the same conditions as in Example 5 except that a mixed xylylenediamine (purity: 99.95 wt %) of 40 mol % of m-xylylenediamine and 60 mol % of p-xylylenediamine was used; and the wall surrounding the vapor phase was kept at 230° C. so as to allow the temperature of vapor phase in the reaction tank to reach a temperature higher than the melting point (202° C.) of the nylon salt composed of the mixed xylylenediamine and sebacic acid when 50% of the total amount of diamine was added dropwise. The obtained copolyamide resin had a relative viscosity of 2.11, a number average molecular weight of 15600, a mole balance (diamine/dicarboxylic acid) of 0.994, YI of −4, and a melting point of 242° C. The batchwise reaction was continuously repeated 10 times in total. The relative viscosity was 2.05 to 2.16, the number average molecular weight was 14600 to 16100, the mole balance was 0.993 to 0.995, and YI was −6 to −2, showing a good stability. After 10 continuous batchwise reactions, no solid matter was detected in the reaction tank and in the partial condenser. The obtained copolyamide resin was made into film, which was then measured for particles. The number of particles detected was 225 particles/g for particles having a size of 50 μm or more, 120 particles/g for particles having a size of 50 to 99 μm, 83 particles/g for particles having a size of 100 to 199 μm, and 22 particles/g for particles having a size of 200 μm or more, providing a good film appearance with extremely small amount of particles. The particles taken by cutting off from the film were measured for the melting point. In addition to the melting point 242° C. of the copolyamide resin, another melting point was observed at 281° C. The obtained copolyamide resin was molded into a molded article, which was then evaluated for properties. The bending modulus was 2930 MPa with a standard deviation of 15, the bending strength was 136 MPa with a standard deviation of 1, and the heat deformation temperature was 170° C. with a standard deviation of 1, showing that the quality stability was also very good.

Example 8

A copolyamide resin was synthesized using the same reaction tank under the same conditions as in Example 5 except that a mixed xylylenediamine (purity: 99.95 wt %) of 20 mol % of m-xylylenediamine and 80 mol % of p-xylylenediamine was used; and the wall surrounding the vapor phase was kept at 230° C. so as to allow the temperature of vapor phase in the reaction tank to reach a temperature higher than the melting point (207° C.) of the nylon salt composed of the mixed xylylenediamine and sebacic acid when 55% of the total amount of diamine was added dropwise. The obtained copolyamide resin had a relative viscosity of 2.10, a number average molecular weight of 15500, a mole balance (diamine/dicarboxylic acid) of 0.994, YI of −4, and a melting point of 263° C. The batchwise reaction was continuously repeated 10 times in total. The relative viscosity was 2.04 to 2.14, the number average molecular weight was 14400 to 16000, the mole balance was 0.993 to 0.995, and YI was −6 to −2, showing a good stability. After 10 continuous batchwise reactions, no solid matter was detected in the reaction tank and in the partial condenser. The obtained copolyamide resin was made into film, which was then measured for particles. The number of particles detected was 283 particles/g for particles having a size of 50 μm or more, 145 particles/g for particles having a size of 50 to 99 μm, 112 particles/g for particles having a size of 100 to 199 μm, and 26 particles/g for particles having a size of 200 μm or more, providing a good film appearance with extremely small amount of particles. The particles taken by cutting off from the film were measured for the melting point. In addition to the melting point 263° C. of the copolyamide resin, another melting point was observed at 292° C. The obtained copolyamide resin was molded into a molded article, which was then evaluated for properties. The bending modulus was 2950 MPa with a standard deviation of 12, the bending strength was 135 MPa with a standard deviation of 1, and the heat deformation temperature was 191° C. with a standard deviation of 2, showing that the quality stability was also very good.

Comparative Example 1

A copolyamide resin was synthesized using the same reaction tank under the same conditions as in Example 3 except for changing the inner pressure of the reaction tank to atmospheric pressure and removing the evaporated water from the reaction system through the partial condenser having its inner temperature kept at 100 to 104° C. and the cooler. Since the viscosity did not increase enough to give a stirring torque corresponding to the intended molecular weight, the reaction was continued for 30 min under reduced pressure to obtain the copolyamide resin. The obtained copolyamide resin had a relative viscosity of 2.01, a number average molecular weight of 14300, a mole balance (diamine/dicarboxylic acid) of 0.988, YI of −1, and a melting point of 269° C., showing that the relative viscosity, the number average molecular weight, and the mole balance were low. After the reaction, a large amount of the nylon salt or polyamide oligomer adhered to the wall surrounding the vapor phase in the reaction tank, and the inside of the partial condenser was partly clogged with white solid matter. After washing the clogged portion, the batchwise reaction was continuously repeated 10 times in total. The relative viscosity was 1.96 to 2.18, the number average molecular weight was 13,700 to 16,500, the mole balance was 0.986 to 0.995, and YI was −4 to −5, showing a large variation. The obtained copolyamide resin was made into film, which was then measured for particles. The number of particles detected was 3230 particles/g for particles having a size of 50 μm or more, 1592 particles/g for particles having a size of 50 to 99 μm, 1386 particles/g for particles having a size of 100 to 199 μm, and 252 particles/g for particles having a size of 200 μm or more, providing a poor film appearance with an extremely rough surface due to a large amount of particles. The particles taken by cutting off from the film were measured for the melting point. In addition to the melting point 269° C. of the copolyamide resin, another melting point was observed at 300° C. The obtained copolyamide resin was molded into a molded article, which was then evaluated for properties. The bending modulus was 4246 MPa with a standard deviation of 94, the bending strength was 172 MPa with a standard deviation of 7, and the heat deformation temperature was 183° C. with a standard deviation of 9, showing that the mechanical properties and heat resistance varied largely and the quality stability was poor.

Comparative Example 2

A copolyamide resin was synthesized using the same reaction tank under the same conditions as in Example 3 except for omitting to heat the wall surrounding the vapor phase in the reaction tank. The temperature of vapor phase was 208° C. when 80% of the total amount of diamine was added dropwise and 227° C. when the dropwise addition of the diamine was completed, thus being lower than the melting point (230° C.) of the nylon salt composed of the mixed xylylenediamine and adipic acid. Thereafter, the temperature reached higher than 230° C. in the course of maintaining the inner pressure at 0.4 MPa. The obtained copolyamide resin had a relative viscosity of 2.09, a number average molecular weight of 15300, a mole balance (diamine/dicarboxylic acid) of 0.994, YI of −6, and a melting point of 269° C. The batchwise reaction was continuously repeated 10 times in total. The relative viscosity was 2.07 to 2.14, the number average molecular weight was 14,900 to 16,000, the mole balance was 0.993 to 0.995, and YI was −7 to −3, showing a good stability. After 10 continuous batchwise reactions, no solid matter was detected in the reaction tank and in the partial condenser. The obtained copolyamide resin was made into film, which was then measured for particles. The number of particles detected was 1148 particles/g for particles having a size of 50 μm or more, 572 particles/g for particles having a size of 50 to 99 μm, 493 particles/g for particles having a size of 100 to 199 μm, and 83 particles/g for particles having a size of 200 μm or more, providing a poor film appearance with an extremely rough surface due to a large amount of particles. The particles taken by cutting off from the film were measured for the melting point. In addition to the melting point 269° C. of the copolyamide resin, another melting point was observed at 290° C. The obtained copolyamide resin was molded into a molded article, which was then evaluated for properties. The bending modulus was 4268 MPa with a standard deviation of 51, the bending strength was 173 MPa with a standard deviation of 4, and the heat deformation temperature was 184° C. with a standard deviation of 4, showing that the mechanical properties and heat resistance varied largely and the quality stability was poor.

Comparative Example 3

Into an oil-jacketed 50-L stainless reaction tank equipped with a partial condenser through which an oil with its temperature regulated was to be passed, a total condenser, a stirring device, a nitrogen gas inlet, and an opening for dropping diamine, 10.000 kg of adipic acid (purity: 99.85 wt %), 9.270 kg of a mixed xylylenediamine (purity: 99.95 wt %) of 60 mol % of m-xylylenediamine and 40 mol % of p-xylylenediamine, and 19 kg of distilled water were charged, and the inner atmosphere of the reaction tank was thoroughly replaced by nitrogen. The reaction tank was sealed and the temperature was raised to 207° C. over 5.7 h while stirring the contents. When the reaction pressure reached 1.9 MPa, the charged water and the eliminated water were removed from the reaction tank over one hour while keeping the pressure constant. During the removal of the water, the temperature was raised to 212° C. The reaction pressure was reduced to atmospheric pressure over 4 h while continuing the removal of the water. At the same time, the reaction temperature was raised to 277° C. Thereafter, the inner pressure of the reaction system was continuously reduced to 600 mmHg over 10 min and the reaction was continued for 5 min. The product was made into pellets in the same manner as in Example 1 to obtain a copolyamide resin.

The obtained copolyamide resin had a relative viscosity of 2.08, a number average molecular weight of 15100, a mole balance (diamine/dicarboxylic acid) of 0.994, YI of −3, and a melting point of 269° C. The batchwise reaction was continuously repeated 10 times in total. The relative viscosity was 2.04 to 2.16, the number average molecular weight was 14,700 to 16,300, the mole balance was 0.993 to 0.995, and YI was −6 to −1, showing a good stability. After 10 continuous batchwise reactions, no solid matter was detected in the reaction tank and in the partial condenser. The obtained copolyamide resin was made into film, which was then measured for particles. The number of particles detected was 1422 particles/g for particles having a size of 50 μm or more, 721 particles/g for particles having a size of 50 to 99 μm, 610 particles/g for particles having a size of 100 to 199 μm, and 91 particles/g for particles having a size of 200 μm or more, providing a poor film appearance with an extremely rough surface due to a large amount of particles. The particles taken by cutting off from the film were measured for the melting point. In addition to the melting point 269° C. of the copolyamide resin, another melting point was observed at 295° C. The obtained copolyamide resin was molded into a molded article, which was then evaluated for properties. The bending modulus was 4251 MPa with a standard deviation of 65, the bending strength was 173 MPa with a standard deviation of 4, and the heat deformation temperature was 173° C. with a standard deviation of 4, showing that the mechanical properties and heat resistance varied largely and the quality stability was poor.

The production conditions and results of evaluating properties of Examples 1 to 8 and Comparative Examples 1 to 3 are shown in Table 1. In Table 1, PXDA is p-xylylenediamine and MXDA is m-xylylenediamine.

TABLE 1

|  | Examples | | |
| --- | --- | --- | --- |
|  | 1 | 2 | 3 |
| Diamine component | PXDA 30 mol %<br>MXDA 70 mol % | PXDA 30 mol %<br>MXDA 70 mol % | PXDA 40 mol %<br>MXDA 60 mol % |
| Dicarboxylic acid component | adipic acid | adipic acid | adipic acid |
| Melting point of nylon salt | 227° C. | 227° C. | 230° C. |
| Production method | addition under pressure | addition under pressure | addition under pressure |

TABLE 1-continued

|  | | | |
|---|---|---|---|
| Reaction pressure | 0.4 MPaG | 0.2 MPaG | 0.4 MPaG |
| Temperature of vapor phase | 227° C. at 70% addition | 227° C. at 70% addition | 230° C. at 70% addition |
| Apparatus after 10 batches | good | good | good |
| Relative viscosity | 2.12 | 2.09 | 2.10 |
| n = 10 | 2.06 to 2.14 | 2.05 to 2.12 | 2.07 to 2.13 |
| Number average molecular weight | 15800 | 15300 | 15500 |
| n = 10 | 14800 to 16000 | 14700 to 15800 | 14900 to 15900 |
| Mole balance | 0.994 | 0.994 | 0.994 |
| n = 10 | 0.993 to 0.995 | 0.993 to 0.995 | 0.993 to 0.995 |
| YI | −5 | −4 | −3 |
| n = 10 | −6 to −3 | −6 to −3 | −5 to −1 |
| Melting point (°C.) | 258 | 258 | 269 |
| High melting point polyamide particles | | | |
| Melting point | 282° C. | 280° C. | 293° C. |
| <50 μm | 104 | 147 | 261 |
| 50 to 99 μm | 53 | 75 | 133 |
| 100 to 199 μm | 42 | 57 | 102 |
| <200 μm | 9 | 15 | 26 |
| Properties of molded article | | | |
| Bending modulus (MPa) | 4280 | 4265 | 4270 |
| Standard deviation | 18 | 15 | 23 |
| Bending strength (MPa) | 174 | 174 | 172 |
| Standard deviation | 1 | 1 | 1 |
| Heat deformation temperature (°C.) | 174 | 175 | 179 |
| Standard deviation | 1 | 1 | 2 |

|  | Examples | | |
|---|---|---|---|
|  | 4 | 5 | 6 |
| Diamine component | PXDA 50 mol % MXDA 50 mol % | PXDA 30 mol % MXDA 70 mol % | PXDA 40 mol % MXDA 60 mol % |
| Dicarboxylic acid component | adipic acid | sebacic acid | sebacic acid |
| Melting point of nylon salt | 238° C. | 191° C. | 197° C. |
| Production method | addition under pressure | addition under pressure | addition under pressure |
| Reaction pressure | 0.4 MPaG | 0.4 MPaG | 0.4 MPaG |
| Temperature of vapor phase | 238° C. at 75% addition | 191° C. at 35% addition | 197° C. at 40% addition |
| Apparatus after 10 batches | good | good | good |
| Relative viscosity | 2.11 | 2.05 | 2.07 |
| n = 10 | 2.06 to 2.16 | 2.00 to 2.13 | 2.04 to 2.10 |
| Number average molecular weight | 15700 | 14900 | 15100 |
| n = 10 | 14800 to 16300 | 14200 to 15900 | 14700 to 15500 |
| Mole balance | 0.993 | 0.994 | 0.994 |
| n = 10 | 0.992 to 0.994 | 0.993 to 0.995 | 0.993 to 0.995 |
| YI | −1 | −5 | −5 |
| n = 10 | −3 to 1 | −7 to −3 | −7 to −3 |
| Melting point (°C.) | 278 | 214 | 223 |
| High melting point polyamide particles | | | |
| Melting point | 302° C. | 250° C. | 260° C. |
| <50 μm | 632 | 198 | 217 |
| 50 to 99 μm | 319 | 102 | 114 |
| 100 to 199 μm | 278 | 75 | 79 |
| <200 μm | 35 | 21 | 24 |
| Properties of molded article | | | |
| Bending modulus (MPa) | 4263 | 2920 | 2900 |

TABLE 1-continued

| | | | |
|---|---|---|---|
| Standard deviation | 28 | 14 | 12 |
| Bending strength (MPa) | 171 | 135 | 134 |
| Standard deviation | 2 | 1 | 1 |
| Heat deformation | | | |
| temperature (° C.) | 189 | 145 | 152 |
| Standard deviation | 2 | 2 | 2 |

| | Examples | |
|---|---|---|
| | 7 | 8 |
| Diamine component | PXDA 60 mol % MXDA 40 mol % | PXDA 80 mol % MXDA 20 mol % |
| Dicarboxylic acid component | sebacic acid | sebacic acid |
| Melting point of nylon salt | 202° C. | 207° C. |
| Production method | addition under pressure | addition under pressure |
| Reaction pressure | 0.4 MPaG | 0.4 MPaG |
| Temperature of vapor phase | 202° C at 50% addition | 207° C at 55% addition |
| Apparatus after 10 batches | good | good |
| Relative viscosity | 2.11 | 2.10 |
| n = 10 | 2.05 to 2.16 | 2.04 to 2.14 |
| Number average molecular weight | 15,600 | 15,500 |
| n = 10 | 14600 to 16100 | 14400 to 16000 |
| Mole balance | 0.994 | 0.994 |
| n = 10 | 0.993 to 0.995 | 0.993 to 0.995 |
| YI | −4 | −4 |
| n = 10 | −6 to −2 | −6 to −2 |
| Melting point (° C.) | 242 | 263 |
| High melting point polyamide particles | | |
| Melting point | 281° C. | 292° C. |
| <50 μm | 225 | 283 |
| 50 to 99 μm | 120 | 145 |
| 100 to 199 μm | 83 | 112 |
| <200 μm | 22 | 26 |
| Properties of molded article | | |
| Bending modulus (MPa) | 2930 | 2950 |
| Standard deviation | 15 | 12 |
| Bending strength (MPa) | 136 | 135 |
| Standard deviation | 1 | 1 |
| Heat deformation | | |
| temperature (° C.) | 170 | 191 |
| Standard deviation | 1 | 2 |

| | Comparative Examples | | |
|---|---|---|---|
| | 1 | 2 | 3 |
| Diamine component | PXDA 40 mol % MXDA 60 mol % | PXDA 40 mol % MXDA 60 mol % | PXDA 40 mol % MXDA 60 mol % |
| Dicarboxylic acid component | adipic acid | adipic acid | adipic acid |
| Melting point of nylon salt | | | |
| Production method | 230° C. atmospheric pressure | 230° C. pressure | 230° C. pressure |
| Reaction pressure | 0.0 MPaG | 0.4 MPaG | 1.9 MPaG |
| Temperature of vapor phase | 230° C. at 70% addition | 230° C. after addition | — |
| Apparatus after 10 batches | poor | good | good |
| Relative viscosity | 2.01 | 2.09 | 2.08 |
| n = 10 | 1.96 to 2.18 | 2.07 to 2.14 | 2.04 to 2.16 |

TABLE 1-continued

| | | | |
|---|---|---|---|
| Number average | | | |
| molecular weight | 14300 | 15300 | 15100 |
| n = 10 | 13700 to 16500 | 14900 to 16000 | 14700 to 16300 |
| Mole balance | 0.988 | 0.994 | 0.994 |
| n = 10 | 0.986 to 0.995 | 0.993 to 0.995 | 0.993 to 0.995 |
| YI | −1 | −6 | −3 |
| n = 10 | −4 to 5 | −7 to −3 | −6 to −1 |
| Melting point (° C.) | 269 | 269 | 269 |
| High melting point polyamide particles | | | |
| Melting point | 300° C. | 290° C. | 295° C. |
| <50 μm | 3230 | 1148 | 1422 |
| 50 to 99 μm | 1592 | 572 | 721 |
| 100 to 199 μm | 1386 | 493 | 610 |
| <200 μm | 252 | 83 | 91 |
| Properties of molded article | | | |
| Bending modulus (MPa) | 4246 | 4268 | 4251 |
| Standard deviation | 94 | 51 | 65 |
| Bending strength (MPa) | 172 | 173 | 173 |
| Standard deviation | 7 | 4 | 4 |
| Heat deformation temperature (° C.) | 183 | 184 | 173 |
| Standard deviation | 9 | 4 | 4 |

INDUSTRIAL APPLICABILITY

The copolyamide resin of the invention is excellent in mechanical properties, heat resistance, chemical and physical properties, and molding properties, and its properties are very stable, therefore, suitably used in a wide application field, such as molded article, film, sheet, and fiber.

What is claimed is:

1. A copolyamide resin, comprising:
   i) a diamine component comprising two or more diamines; and
   ii) a dicarboxylic acid component,
   wherein the diamine component comprises 70 mol % or more of a xylylenediamine comprising 20 mol % or more of p-xylylenediamine, and the dicarboxylic acid component comprises 70 mol % or more of a straight-chain aliphatic dicarboxylic acid having 6 to 18 carbon atoms, and
   wherein a cast film formed by melting the copolyamide resin at a temperature 10° C. higher than the melting point of the copolyamide resin comprises particles having a major diameter of 50 μm or more in an amount of 1000 particles/g or less but more than 0, the particles comprising a polyamide having a melting point higher than that of the copolyamide resin by 20° C. or more when measured by a differential scanning calorimetry.

2. The copolyamide resin of claim 1, having a relative viscosity of 1.80 to 4.20 at 25° C. when measured in a sulfuric acid solution at a concentration of 1 g copolyamide resin per 100 mL of 96% concentrated sulfuric acid.

3. The copolyamide resin of claim 1, wherein the dicarboxylic acid component comprises 70 mol % or more of adipic acid, sebacic acid, or a mixture of both.

4. The copolyamide resin of claim 1, wherein the xylylenediamine consists of m-xylylenediamine and p-xylylenediamine.

5. The copolyamide resin of claim 1, wherein a cast film produced by melting the copolyamide resin at a temperature 10° C. higher than the melting point of the copolyamide resin comprises particles having a major diameter of 200 μm or more in an amount of 100 particles/g or less, the particles comprising a polyamide having a melting point higher than that of the copolyamide resin by 20° C. or more when measured by a differential scanning calorimetry.

6. A copolyamide resin composition comprising 100 parts by weight of the copolyamide resin of claim 1, 0 to 30 parts by weight of talc, and 10 to 150 parts by weight of an inorganic filler.

7. A molded article produced by molding the copolyamide resin of claim 1.

8. A molded article produced by molding the copolyamide resin composition of claim 6.

9. A method of producing a copolyamide resin comprising i) a diamine component comprising two or more diamines, and ii) a dicarboxylic acid component,
   wherein the diamine component comprises 70 mol % or more of a xylylenediamine comprising 20 mol % or more of p-xylylenediamine, and the dicarboxylic acid component comprises 70 mol % or more of a straight-chain aliphatic dicarboxylic acid having 6 to 18 carbon atoms, and
   the method comprises subjecting the diamine component and the dicarboxylic acid component to a polycondensation reaction, in the absence of a solvent, in a batch-wise reaction tank equipped with a partial condenser, and conducting the polycondensation reaction by adding the diamine component to the molten dicarboxylic acid component continuously or intermittently while maintaining an inner pressure of the reaction tank at 0.1 MPaG or more and a reaction system at a temperature which allows a whole reaction system to be kept in fluid state, and by heating a vapor phase in the reaction tank to a temperature equal to or higher than a melting point of a nylon salt comprising the diamine component and the dicarboxylic acid component before adding 80% of a total amount of the diamine component.

10. The method of claim 9, wherein the copolyamide resin obtained has a relative viscosity of 1.80 to 4.20 at 25° C. when measured in a sulfuric acid solution at a concentration of 1 g copolyamide resin per 100 mL of 96% concentrated sulfuric acid.

11. The method of claim 9, wherein the dicarboxylic acid component comprises 70 mol % or more of adipic acid, sebacic acid, or a mixture of both.

12. The method of claim 9, wherein the xylylenediamine consists of m-xylylenediamine and p-xylylenediamine.

13. The copolyamide resin of claim 1, wherein the dicarboxylic acid component comprises 90 mol % or more of adipic acid, sebacic acid, or a mixture of both.

14. The copolyamide resin of claim 1, wherein the diamine component comprises 90 mol % or more of the xylylenediamine.

15. The copolyamide resin of claim 1, wherein the xylylenediamine comprises 30 mol % or more of p-xylylenediamine.

16. The copolyamide resin of claim 1, wherein the xylylenediamine comprises 90 mol % or less of p-xylylenediamine.

17. The copolyamide resin of claim 1, wherein the xylylenediamine comprises 50 mol % or less of p-xylylenediamine.

18. The copolyamid resin of claim 1, having a relative viscosity of 1.95 to 3.00 at 25° C. when measured in a sulfuric acid solution at a concentration of 1 g copolyamide resin per 100 mL of 96% concentrated sulfuric acid.

19. The copolyamide resin of claim 1, wherein a cast film produced by melting the copolyamide resin at a temperature 10° C. higher than the melting point of the copolyamide resin comprises particles having a major diameter of 50 μm or more in an amount of 600 particles/g or less, the particles comprising a polyamide having a melting point higher than that of the copolyamide resin by 20° C. or more when measured by a differential scanning calorimetry.

* * * * *